United States Patent [19]

Imai et al.

[11] Patent Number: 4,770,941

[45] Date of Patent: Sep. 13, 1988

[54] MAGNETIC RECORDING MEDIUM AND A COATING COMPOSITION THEREFOR

[75] Inventors: Kyoiti Imai; Masahiko Ikka, both of Fukui, Japan

[73] Assignee: Nisshin Chemical Industry Co., Ltd., Takefu, Japan

[21] Appl. No.: 946,518

[22] Filed: Dec. 24, 1986

[51] Int. Cl.$^4$ .............................................. G11B 5/702
[52] U.S. Cl. ................................ 428/411.1; 252/62.54; 427/128; 428/413; 428/522; 428/694; 428/695; 428/900
[58] Field of Search ............... 428/694, 68, 900, 522, 428/411.1, 328, 413, 416, 418; 427/128, 131; 252/62.54; 360/134–136

[56] References Cited

U.S. PATENT DOCUMENTS

| | | | |
|---|---|---|---|
| 4,004,997 | 1/1977 | Tsukamoto | 428/329 |
| 4,368,237 | 1/1983 | Yamada | 428/900 |
| 4,415,630 | 11/1983 | Kubota | 427/128 |
| 4,562,117 | 12/1985 | Kikukawa | 428/407 |
| 4,594,174 | 6/1986 | Nakayama | 428/900 |
| 4,600,521 | 7/1986 | Nakamura | 428/694 |
| 4,707,410 | 11/1987 | Hata | 428/328 |
| 4,707,411 | 11/1987 | Nakayama | 428/413 |
| 4,734,330 | 3/1988 | Oiyama | 428/900 |

FOREIGN PATENT DOCUMENTS

| | | | |
|---|---|---|---|
| 3622070 | 1/1987 | Fed. Rep. of Germany | 428/694 |
| 028924 | 2/1987 | Japan | 428/694 |

*Primary Examiner*—Ellis P. Robinson
*Attorney, Agent, or Firm*—Hopgood, Calimafde, Kalil, Blaustein & Judlowe

[57] ABSTRACT

The invention provides a magnetic coating composition capable of giving a magnetic recording medium having improved properties in respect of the dispersibility of the ferromagnetic particles in the vehicle resin and the surface properties of the magnetic recording medium coated therewith. The inventive magnetic coating composition is characteristic in the use of a specific vehicle resin having a polymeric molecular structure composed of the monomeric units of vinyl chloride, vinyl alcohol, amine-modified vinyl and, optionally, vinyl carboxylate and epoxy-containing a monomer in specified proportions.

4 Claims, No Drawings

MAGNETIC RECORDING MEDIUM AND A COATING COMPOSITION THEREFOR

BACKGROUND OF THE INVENTION

The present invention relates to a magnetic recording medium and a coating composition therefor containing fine particles of a ferromagnetic material dispersed therein as well as a vehicle resin as a binder of the ferromagnetic particles therein. More particularly, the invention relates to an improvement of the vehicle resin in a magnetic coating composition for forming a magnetic coating layer on a base material of a magnetic recording medium to impart excellent performance thereto with very high binding power for the ferromagnetic particles.

As is known, magnetic recording media such as magnetic recording tapes, floppy disc sheets and the like are prepared by providing a film or sheet-like substrate or base material of polyester resins and the like on one of the surfaces with a magnetic coating layer by coating with a magnetic coating composition comprising fine particles of a ferromagetic material and a vehicle resin to serve as a binder of the ferromagnetic particles dispersed and dissolved in an organic solvent. Various kinds of ferromagnetic materials are used as the ferromagnetic powder in the magnetic coating composition including powders of iron oxides, e.g. $\gamma$-$Fe_2O_3$ and $Fe_3O_4$, iron oxide powders doped with cobalt ions or iron oxide powders on which cobalt ions are adsorbed, needle-like fine particles of powders of ferromagnetic metals such as iron, cobalt and alloys of iron and cobalt optionally containing nickel.

Along with the trend in recent years toward upgrading of the performance of the video and audio instruments, the magnetic recording tapes used in these instruments are also required to have a high density of recorded signals and high output in playing back of the recorded signals, in particular, in short wavelength recording. It is essential in order to comply with these requirements that the powder of the ferromagnetic material should be pulverized more and more finely in addition to the improvement in the magnetic properties thereof. Accordingly, the ferromagnetic particles have an extremely large magnetic moment so that the particles readily form agglomerates which can hardly be dispersed with sufficient uniformity in the vehicle resin of the magnetic coating composition.

Extensive investigations have been undertaken to solve the above described problem of poor dispersibility of the ferromagnetic particles in the vehicle resin of a magnetic coating composition from the standpoint of affinity between the ferromagnetic powder and the vehicle resin. For example, some of the vehicle resins conventionally used in magnetic coating compositions are vinyl chloride-based ones having carboxyl and hydroxy groups in the molecular structure thereof although the dispersibility of ferromagnetic particles therein is not quite satisfactory so that the magnetic coating layer has poor surface properties not to impart the magnetic coating layer with full magnetic performance such as residual magnetic flux and squareness ratio of the hysteresis curve in addition to the low durability of the coating layer due to dusting frequently taking place.

In order to improve the dispersibility of the ferromagnetic particles in the vehicle resin and to increase the smoothness of the surface of the magnetic coating layer, alternatively, various attempts and proposals have been made hitherto including addition of a surface active agent or a silane coupling agent having reactivity with the vehicle resin to the coating composition, surface treatment of the ferromagnetic particles beforehand with a silicone fluid and so on, although none of these prior art methods is quite satisfactory. Accordingly, it has been eagerly desired to develop a novel and improved magnetic coating composition capable of giving a magnetic recording medium free from the above described problems and disadvantages in the prior art products by virtue of the use of a specific vehicle resin in the coating composition so as to give good dispersibility of the ferromagnetic particles therein.

SUMMARY OF THE INVENTION

It is therefore an object of the present invention to provide a novel synthetic resin which is suitable as a vehicle resin in a magnetic coating composition for a magnetic recording medium and having good affinity with and capable of giving excellent dispersibility to ferromagnetic particles.

Another object of the invention is to provide a novel magnetic coating composition for a magnetic recording medium comprising a specific synthetic resin as the vehicle capable of giving the ferromagnetic particles with good dispersibility in the coating composition.

A further object of the invention is to provide a magnetic recording medium having excellent surface properties, magnetic properties and durability as being prepared using the above mentioned novel magnetic coating composition.

Thus, the magnetic coating composition of the present invention comprises:

(A) an organic solvent;
(B) fine particles of a ferromagnetic material dispersed in the organic solvent; and
(C) a polymeric synthetic resin dissolved in the organic solvent, the polymeric molecules thereof being composed of
  (a) from 60 to 95% by weight of the monomeric units of vinyl chloride of the formula $-CH_2-CHCl-$,
  (b) from 2 to 16% by weight of the monomeric units of vinyl alcohol of the formula $-CH_2-CHOH-$, and
  (c) from 0.05 to 5% by weight of the monomeric units of an amine-modified vinyl.

In addition to the above mentioned three types of the monomeric units (a), (b) and (c), the polymeric structure of the synthetic resin as the component (C) of the inventive magnetic coating composition may further comprise
  (d) from 0.5 to 39% by weight of the monomeric units of a vinyl carboxylate, and
  (e) from 0.1 to 20% by weight of the monomeric units of an epoxy-containing monomer.

DETAILED DESCRIPTION OF THE PREFERRED EMBODIMENTS

As is understood from the above given summary of the invention defining the magnetic coating composition, the most characteristic feature of the inventive magnetic coating composition consists in the use of a specific synthetic resin as a vehicle composed of the three types of the monomeric units (a), (b) and (c), optionally, with further types of the monomeric units of (d) and (e). When such a synthetic resin is used as the vehicle in the magnetic coating composition, unexpectedly high dispersibility of the ferromagnetic particles can be obtained in the coating composition in comparison with those in which the vehicle is a combination of a conventional copolymeric resin of vinyl chloride and vinyl acetate and a polyurethane resin with admixture of a surface active agent. In such a formulation of the coating composition, namely, seemingly very good dispersion of the ferromagnetic particles can be obtained when the ferromagnetic particles are dispersed in an organic solvent containing a surface active agent while the dispersibility of the particles is decreased when the vehicle resins are dissolved in the dispersion. On the contrary, the above described vehicle resin used in the inventive magnetic coating composition is free from such a disadvantage to effectively prevent agglomeration of the ferromagnetic particles even in prolonged storage of the composition. Needless to say, the vehicle resin can exhibit quite satisfactory adhesion to the base material of the magnetic recording medium and the magnetic recording medium, e.g. a magnetic recording tape, having a coating layer of the inventive magnetic coating composition has excellent physical properties and durability.

As is described above, the monomeric units, of which the polymeric synthetic resin as the vehicle in the inventive coating composition is composed, essentially include the three types of the units (a), (b) and (c) in weight fractions of 60 to 95%, 2 to 16% and 0.05 to 5%, respectively. When the weight fraction of the monomeric units (a) of vinyl chloride is too small, the magnetic coating layer formed of the magnetic coating composition would have poor mechanical properties while a resin in which the weight fraction of the monomeric units (a) of vinyl chloride is too large would have poor solubility in organic solvents to cause some inconvenience in the preparation and use of the coating composition. When the weight fraction of the monomeric units (b) of vinyl alcohol is too small in the vehicle resin, the dispersibility of the ferromagnetic particles in the coating composition containing the resin would be decreased in addition to the decreased compatibility of the resin with other optionally admixed vehicle resins such as polyurethane resins while the mechanical strength and heat stability of the magnetic coating layer would be decreased when the vehicle resin of the coating composition comprises a too large weight fraction of the monomeric units (b). When the weight fraction of the monomeric units (c) of the amine-modified vinyl is too small, the dispersibility of the ferromagnetic particles in the coating composition would be decreased and the magnetic coating layer formed of such a magnetic coating composition would have poor smoothness of the surface while the dispersibility of the ferromagnetic particles and the smoothness of the surface of the coating layer would also be decreased by use of a vehicle resin comprising a too large weight fraction of the monomeric units (c) in addition to the decrease in the solubility of the resin in organic solvents to such an extent that the resin is no longer useful as a vehicle of a coating composition.

The synthetic resin as the vehicle of the inventive magnetic coating composition should preferably have an average degree of polymerization in the range from 200 to 800. When the average degree of polymerization of the resin is too low, the magnetic coating layer formed of a coating composition containing such a resin as the vehicle would be brittle and have poor mechanical strengths so that the durability of the magnetic recording medium is decreased. When the average degree of polymerization of the resin is too high, on the other hand, the magnetic coating composition containing a necessary amount of the vehicle resin would have an unduly high viscosity or consistency so as to cause difficulties in handling thereof and decrease in the workability therewith in the coating works.

The synthetic resin as the vehicle in the inventive magnetic coating composition can be prepared by the polymerization of a monomer mixture mainly composed of vinyl chloride in any conventional polymerization process such as suspension polymerization, emulsion polymerization, solution polymerization and bulk polymerization. The monomeric units (b) of vinyl alcohol can be introduced by the copolymerization of vinyl chloride with a vinyl ester of a lower carboxylic acid such as vinyl acetate, vinyl propionate and the like followed by saponification of the copolymer in a conventional manner and then by purification. The saponification reaction is performed by dissolving or dispersing the copolymer in an organic solvent with addition of an alkali such as potassium hydroxide, sodium hydroxide, sodium alcoholate and the like. Inorganic acids such as hydrochloric and sulfuric acids can be used as a catalyst. The saponification reaction may not be complete so as to leave a small amount of the monomeric units of the vinyl carboxylate such as vinyl acetate and vinyl propionate. The amount of the vinyl carboxylate in the monomer mixture for the copolymerization should be adequately controlled so that the copolymer after the saponification reaction should have from 2 to 16% by weight of the monomeric units of vinyl alcohol. The degree of saponification is also a parameter which influences the weight fraction of the monomeric units of vinyl alcohol in the copolymer after the saponification reaction. The monomer mixture for the copolymerization may optionally contain a small amount of other copolymerizable monomers including vinyl ester of a Versatic Acid, alkyl esters of acrylic or methacrylic acid, esters of maleic acid or itaconic acid, vinylidene chloride, various vinyl ethers and the like.

The monomeric units (c) of the amine-modified vinyl can be introduced into the copolymer in the same time as the saponification of a copolymer comprising the monomeric units of vinyl chloride and vinyl carboxylate. Namely, the saponification reaction of the copolymer is performed in a reaction mixture containing an amine compound described later at a temperature between 10° C. and 80° C. under agitation for a length of time sufficient to give a desired degree of saponification so that the chlorine atoms in the vinyl chloride units of the copolymer concurrently react with the amine compound to be replaced with the amine moiety as the side chain of the copolymer molecule. The amount of the amine compound added to the reaction mixture is determinant of the weight fraction of the monomeric units (c) of the amine-modified vinyl which should be in the range from 0.05 to 5% by weight. The amine-modified vinyl units can alternatively be introduced into the copolymer molecules by the saponification of the vinyl chloride-vinyl carboxylate copolymer in an ordinary manner followed by the reaction of the thus saponified copolymer dissolved or dispersed in an organic solvent with an amine compound although the above described method of concurrent saponification and amination is more convenient and preferred.

The amine compound usable in the above described reaction includes primary, secondary and tertiary amines belonging to the classes of aliphatic amines, alicyclic amines, alkanol amines, alkoxyalkyl amines and aromatic amines. Particularly exemplary of the amine compound are methyl amine, ethyl amine, propyl amine, butyl amine, cyclohexyl amine, ethanolamine, naphthyl amine, aniline, o-toluidine, diethyl amine, dioctyl amine, diisobutyl amine, diethanolamine, diaminopropane, hexamethylene diamine, methyl athanolamine, dimethyl ethanolamine, dibutyl ethanolamine, methyl diethanolamine, 2-methoxyethyl amine, di2-methoxyethyl amine, N-methyl aniline, trimethyl amine, triethyl amine, triisobutyl amine, tridecyl amine, N-methyl diphenyl amine, hexamethylene tetramine, triethanolamine, tributyl amine, dimethyl propyl amine, pyridine, α-, β- and γ-picolines, 2,4-lutidine, quinoline, morphonline and the like.

As is mentioned before, the saponification reaction of a copolymer of vinyl chloride and vinyl carboxylate, e.g. vinyl acetate, is performed in the presence of an alkali or an inorganic acid. The use of an inorganic acid is of course not advantageous due to the low velocity of the reaction. The use of an alkali is also not without problems because the alkali metal ions in the alkali remaining in the saponified copolymer form a chloride, e.g. sodium chloride, with the chlorine originating in the vinyl chloride moiety of the copolymer while such a copolymeric resin is not desirable as a vehicle of the magnetic coating composition in respect of contamination of the magnetic head with the chloride. While the saponification reaction of a vinyl chloride-vinyl carboxylate copolymer is usually performed using an alkali as an essential saponification agent, it has been unexpectedly discovered that, when the copolymer subjected to the saponification reaction contains the monomeric units (e) derived from an epoxy-containing monomer, the saponification reaction can proceed with an amine compound alone in the absence of an alkali as the ordinary saponification agent. When the saponification reaction is performed with an amine compound as the saponification agent, namely, the saponification reaction proceeds at a sufficiently high velocity and the copolymeric resin obtained by saponification in this manner has absolutely no problem of contamination of the magnetic head as a vehicle of the magnetic coating composition even when the resin contains a small amount of the unreacted amine compound left therein unremoved.

It should be noted that, although certain improvement of a magnetic coating layer can be obtained in respect of the dispersibility of the ferromagnetic powder and smoothness of the surface when the magnetic coating composition comprising a ferromagnetic powder and conventional vehicle resin is admixed with the above named amine compound as such without being incorporated into the molecular structure of the vehicle resin, the dispersibility of the magnetic powder once improved thereby gradually decreases in the lapse of time so that no reliable results can be expected.

As is described above, the polymeric molecule of the vehicle resin in the inventive magnetic coating composition is composed essentially of three types of the monomeric units (a), (b) and (c) while it is further advantageous that two more types of monomeric units are comprised in the polymeric molecule of the resin including (d) from 0.5 to 39% by weight of monomeric units of a vinyl carboxylate and (e) from 0.1 to 20% by weight of monomeric units having an epoxy group. The monomeric units (d) of vinyl carboxylate have an effect to impart the copolymeric resin with increased solubility in organic solvents while a too large weight fraction of such monomeric units has an adverse effect on the mechanical strength of the magnetic coating layer formed of the inventive coating composition. The epoxy-containing monomeric units (e) have an effect to increase the heat resistance of the magnetic coating layer formed of the inventive coating composition while a too large weight fraction thereof in the copolymeric resin also has an adverse effect on the mechanical strength of the magnetic coating layer.

It is optional that the magnetic coating composition of the invention comprises the above described copolymeric resin as the vehicle in combination with other kinds of resins in a limited amount, for example, smaller than 50% by weight of the overall amount of the resinous vehicle. Usable resins include polyurethane resins, nitrocelluloses, polyester resins, epoxy resins, polyamide resins, phenolic resins, alkyd resins and polyvinyl butyral resins as well as polymers and copolymers of ethylenically unsaturated monomers such as esters of acrylic and methacrylic acids, styrene, acrylonitrile, butadiene, ethylene, propylene, vinylidene chloride and the like. Particularly preferably among the above named resins are polyurethane resins and nitrocelluloses.

It is further desirable that the inventive magnetic coating composition is admixed with a polyisocyanate-based curing agent such as trifunctional isocyanates and urethane prepolymers having isocyanate groups at the molecular chain ends. Various grade of commercial products of such curing agents are available. The amount of these curing agents in the inventive magnetic coating composition should be in the range from 5 to 40 parts by weight per 100 parts by weight of the resinous vehicle.

The ferromagnetic powder dispersed in the inventive magnetic coating composition may be any of conventionally used ones including $\gamma\text{-Fe}_2\text{O}_3$, $\text{Fe}_3\text{O}_4$ with or without doping with cobalt ions, and $\text{CrO}_2$ as well as metallic particles of iron, cobalt and iron-cobalt alloys optionally containing nickel. The amount of the resinous vehicle should preferably be in the range from 8 to 50 parts by weight per 100 parts by weight of the ferromagnetic powder.

The magnetic coating composition of the invention is prepared by dissolving and dispersing the vehicle resin and the ferromagnetic powder in an organic solvent such as methyl ethyl ketone, methyl isobutyl ketone, cyclohexanone, toluene and the like. The magnetic coating composition may further contain various kinds of optional additives conventionally used in magnetic coating compositions including lubricants, abrasives, antistatic agents, dispersion aids, rust inhibitors and the like.

The magnetic recording medium is manufactured by uniformly applying the thus prepared magnetic coating composition to a suitable substrate material such as films, sheets, tapes and plates of synthetic resins such as polyesters, polyolefins, cellulose acetates, polycarbonates and the like, non-magnetic metals, ceramics and so on. Any conventional known method can be applied to the application of the magnetic coating composition on to the substrate, if necessary, followed by calendering to increase the smoothness of the surface to give a magnetic recording medium of high performance.

In the following, the present invention is described in more detail by way of examples preceded by the description of the preparation of the copolymeric resin used in the inventive magnetic coating compositions. In the following description, the term "parts" always refers to "parts by weight".

Preparation 1

Into an autoclave equipped with a stirrer after purging of the air inside with nitrogen were introduced 400 parts of dionized water, 72 parts of vinyl chloride, 56 parts of vinyl acetate, 6 parts of trichloroethylene, 0.6 part of di(2-ethylhexyl) peroxy dicarbonate and 2 parts of a partially saponified polyvinyl alcohol and the temperature of the mixture under agitation was increased to 60° C. to start the polymerization reaction followed by additional introduction of 72 parts of vinyl chloride monomer under pressurization to effect the polymerization reaction.

When the pressure inside the autoclave had decreased to 0.5 kg/cm$^2$G after 12 hours of the reaction, the pressure inside the autoclave was released and the polymerizate slurry was discharged out of the autoclave after cooling. The polymerizate slurry was washed three times each with 1000 parts of deionized water followed by dehydration by filtration and drying at 50° C. to give 160 parts of a copolymeric resin having an average degree of polymerization of 380 and composed of 75.3% by weight of the monomeric units of vinyl chloride and 24.7% by weight of the monomeric units of vinyl acetate.

The thus obtained copolymeric resin in an amount of 160 parts was introduced into a reaction vessel equipped with a stirrer and provided with a jacket for a heating and cooling medium together with 432 parts of methyl alcohol, 48 parts of toluene, 16 parts of sodium hydroxide and 8 parts of morpholine and the reaction mixture was agitated at 40° C. for 6 hours to effect the saponification reaction. The reaction product was washed three times each with 1000 parts of methyl alcohol and then two times each with 1000 parts of deionized water and dehydrated by filtration followed by drying. The polymer was dissolved in 800 parts of methyl ethyl ketone and reprecipitated by adding 3000 parts of methyl alcohol under agitation followed by filtration. This procedure of dissolution and reprecipitation was twice repeated followed by washing of the polymer twice each with 1000 parts of deionized water and then dehydration by filtration and drying to give 128 parts of the product which is referred to as the Polymer I hereinbelow. This product was a copolymer having an average degree of polymerization of 320 and composed of 85.8% by weight of the monomeric units of vinyl chloride, 11.5% by weight of the monomeric units of vinyl alcohol, 2.2% by weight of the monomeric units of unsaponified vinyl acetate and 0.5% by weight of the monomeric units of morpholine-modified vinyl.

Preparation 2

Into an autoclave equipped with a stirrer after purging of the air inside with nitrogen were introduced 400 parts of deionized water, 72 parts of vinyl chloride, 56 parts of vinyl acetate, 1 part of ammonium persulfate and 4 parts of polyoxyethylene nonyl phenyl ether and the temperature of the mixture under agitation was increased to 55° C. to start the polymerization reaction. Thereafter, 72 parts of vinyl chloride monomer were additionally introduced into the polymerization mixture continuously over a period of 8 hours to complete the copolymerization reaction followed by aging of the polymerizate emulsion for 6 hours. The emulsion was then admixed with 50 parts of sodium chloride, 20 parts of a 5% hydrochloric acid and 500 parts of hot water to give a slurry followed by filtration to give a cake which was again dispersed and washed in 1200 parts of deionized water and filtrated. This procedure of dispersion and washing of the polymer in water and filtration was repeated five times followed by drying to give 150 parts of a copolymeric product having an average degree of polymerization of 400 and composed of 73.8% by weight of the monomeric units of vinyl chloride and 26.2% by weight of the monomeric units of vinyl acetate.

The thus obtained copolymer in an amount of 150 parts was introduced into a reaction vessel equipped with a stirrer and provided with a jacket together with 400 parts of methyl alcohol, 50 parts of xylene, 15 parts of sodium hydroxide and 40 parts of morpholine and the mixture was agitated for 6 hours at 40° C. to effect the saponification reaction. The saponified copolymer was washed three times with methyl alcohol and then two times with deionized water in the same manner as in Preparation 1 followed by filtration and drying. The copolymer was purified by twice repeating the procedure of reprecipitation by dissolution in mehtyl ethyl ketone and precipitation with addition of methyl alcohol and then washed twice with deionized water followed by filtration and drying to give 125 parts of a copolymeric product which is referred to as the Polymer II hereinbelow. This product had an average degree of polymerization of 300 and composed of 85.6% by weight of the monomeric units of vinyl chloride, 11.2% by weight of the monomeric units of vinyl alcohol, 2.1% by weight of the monomeric units of unsaponified vinyl acetate amd 1.1% by weight of the monomeric units of morpholine-modified vinyl.

Preparation 3

Saponified copolymeric products, referred to as the Polymers III, IV, V and VI hereinbelow, were prepared each in substantially the same manner as in Preparation 1 described above except that the vinyl acetate in Preparation 1 was replaced with different types of vinyl carboxylates including vinyl ester of Versatic Acid and vinyl propionate for the Polymers IV and V, respectively, and the amine compounds used for the modification were n-butyl amine, pyridine and aniline instead of morpholine for the Polymers IV, V and VI, respectively. The Polymer VI also contained the monomeric units of 2-ethylhexyl acrylate. Table 1 given below summarizes the weight fractions of the different types of the monomeric units in these Polymers III to VI together with the results of the Polymers I and II including the monomeric units of vinyl chloride, vinyl alcohol, vinyl carboxylate, amine-modified vinyl and 2-ethylhexyl acrylate as well as the average degrees of polymerization.

TABLE 1

| | | Polymer No. | | | | | |
|---|---|---|---|---|---|---|---|
| | | I | II | III | IV | V | VI |
| Weight fraction of monomeric units, % by weight | Vinyl chloride | 85.8 | 85.6 | 83.8 | 90.6 | 86.3 | 82.3 |
| | Vinyl alcohol | 11.5 | 11.2 | 11.0 | 5.6 | 3.4 | 15.0 |
| | Vinyl carboxylate | 2.2 | 2.1 | 2.1 | 3.1 | 8.1 | 0.5 |
| | Amine- | 0.5 | 1.1 | 3.1 | 0.7 | 2.2 | 0.1 |

TABLE 1-continued

| | Polymer No. | | | | | |
|---|---|---|---|---|---|---|
| | I | II | III | IV | V | VI |
| modified vinyl | | | | | | |
| 2-Ethyl hexyl acrylate | — | — | — | — | — | 2.1 |
| Average degree of polymerization | 320 | 300 | 280 | 430 | 450 | 410 |

Preparation 4

For comparison, Polymers VII, VIII, IX, X, XI and XII were prepared each in substantially the same manner as in Preparation 1 for the Polymers VII and IX to XII and as in Preparation 2 for the Polymer VIII, respectively, except that no amine compound was added to the reaction mixture for the saponification reaction. Table 2 given below summarizes the weight fractions in % of the various types of the monomeric units in each of these Polymers and the average degrees of polymerization thereof. The vinyl carboxylate used for the Polymers VII, VIII, X and XII was vinyl acetate and the vinyl carboxylate used for the Polymers IX and XI was vinyl propionate.

TABLE 2

| | | Polymer No. | | | | | |
|---|---|---|---|---|---|---|---|
| | | VII | VIII | IX | X | XI | XII |
| Weight fraction of monomeric units, % by weight | Vinyl chloride | 85.3 | 86.8 | 88.3 | 90.5 | 87.8 | 82.3 |
| | Vinyl alcohol | 11.5 | 12.4 | 3.5 | 5.9 | 3.6 | 15.1 |
| | Vinyl carboxylate | 2.2 | 0.8 | 8.2 | 3.6 | 8.6 | 0.5 |
| | 2-Ethyl hexyl acrylate | — | — | — | — | — | 2.1 |
| Average degree of polymerization | | 320 | 270 | 430 | 420 | 450 | 370 |

Preparation 5

Into an autoclave equipped with a stirrer were introduced, after purging of the air inside with nitrogen, 400 parts of deionized water, 73 parts of vinyl chloride, 44 parts of vinyl acetate, 6 parts of trichloroethylene, 0.6 part of di(2-ethylhexyl) peroxy dicarbonate and 2 parts of a partially saponified polyvinyl alcohol to form a polymerization mixture, which was heated under agitation up to a temperature of 60° C. to start the polymerization reaction. Thereafter, 73 parts of vinyl chloride and 10 parts of glycidyl methacrylate were additionally introduced into the autoclave under pressurization continuously over a period of 8 hours to continue the polymerization reaction. When the pressure inside the autoclave had dropped to 0.5 kg/cm²G after 12 hours of the reaction, the pressure of the autoclave was released and the polymerizate slurry after cooling was discharged out of the autoclave, washed three times each with 1000 parts of deionized water, filtered and dried at 50° C. In this manner, 160 parts of a copolymer having an average degree of polymerization of 390 were obtained as composed of the monomeric units of 72.3% by weight of vinyl chloride, 24.7% by weight of vinyl acetate and 3.0% by weight of glycidyl methacrylate.

The copolymer was introduced into a reaction vessel having a jacket and equipped with a stirrer together with 480 parts of methyl alcohol and 3 parts of dimethyl ethanolamine and the mixture was heated under agitation at 45° C. for 6 hours and the reaction product was washed three times each with 1000 parts of methyl alcohol and then two times each with 1000 parts of deionized water followed by filtration and drying to give 128 parts of an amine-modified copolymer in a powdery form having an average degree of polymerization of 320, which is referred to as the Polymer XIII hereinbelow. The Polymer XIII was composed of the monomeric units of 85.2% by weight of vinyl chloride, 11.8% by weight of vinyl alcohol, 1.0% by weight of vinyl acetate, 0.5% by weight of glycidyl methacrylate and 1.5% by weight of amine-modified vinyl.

Preparation 6

Into an autoclave equipped with a stirrer were introduced, after purging of the air inside with nitrogen, 400 parts of deionized water, 79 parts of vinyl chloride, 32 parts of vinyl acetate, 1 part of ammonium persulfate and 4 parts of polyoxyethylene nonyl phenyl ether to form a polymerization mixture, which was heated under agitation up to a temperature of 55° C. to start the polymerization reaction. Thereafter, 79 parts of vinyl chloride and 10 parts of allyl glycidyl ether were additionally introduced into the autoclave under pressurization continuously over a period of 8 hours to continue the polymerization reaction for additional 6 hours to give an aqueous emulsion of a copolymer.

After cooling, the emulsion was discharged out of the autoclave and admixed with 50 parts of sodium chloride, 20 parts of a 5% diluted hydrochloric acid and 500 parts of hot water to effect salting-out of the emulsified polymer into a slurry followed by filtration thereof. The polymer cake thus obtained was washed by dispersing in 1200 parts of deionized water and again filtered. This procedure of dispersion in water and filtration was repeated five times and the finally obtained polymer cake was dried to give 150 parts of a copolymer having an average degree of polymerization of 410. The copolymer was composed of the monomeric units of 80% by weight of vinyl chloride, 15% by weight of vinyl acetate and 5% by weight of allyl glycidyl ether.

The copolymer was introduced into a reaction vessel having a jacket and equipped with a stirrer together with 450 parts of methyl alcohol and 3 parts of dibutyl amine and the mixture was agitated at 40° C. for 6 hours. The reaction product was washed with methyl alcohol and deionized water in the same manner as in the preparation of the Polymer XIII to give 125 parts of a copolymer having an average degree of polymerization of 420 in a powdery form, which is referred to as the Polymer XIV hereinbelow. The Polymer XIV was composed of the monomeric units of 89.8% by weight of vinyl chloride, 5.8% by weight of vinyl alcohol, 2.5% by weight of vinyl acetate, 0.8% by weight of epoxy-containing vinyl and 1.1% by weight of amine-modified vinyl.

Preparation 7

Four runs of the copolymerization reaction followed by processing of the copolymer were undertaken in substantially the same manner as in the preparation of the Polymer XIII to give Polymers XV, XVI, XVII and XVIII except that the vinyl carboxylates were vinyl propionate and vinyl ester of Versatic Acid in the Polymers XVI, XVII, respectively, and the epoxy-containing monomer used in the preparation of the Polymer XVII was allyl glycidyl ether. 2-ethylhexyl acrylate was used additionally in the preparation of the Polymer XVIII. The weight fractions of the respective types of the monomeric units in each of these Polymers were as shown in Table 3 below which also shows the average degrees of polymerization of the Polymers together with the data for the Polymers XIII and XIV.

Preparation 8

Eight polymers, referred to as the Polymers XIX to XXVI hereinbelow, were prepared each in a similar manner to the preceding Preparations. No epoxy-containing monomer was used in the preparation of the Polymers XIX to XXV. In the preparation of the Polymers XIX, XXII, XXIII and XXIV, the polymerization reaction was undertaken in a manner similar to Preparation 5 and the saponification reaction of the copolymer was performed using sodium hydroxide and dimethyl ethanolamine. The vinyl carboxylates used in the preparation of the Polymers XXIII and XXIV were vinyl propionate and vinyl ester of Versatic Acid, respectively.

TABLE 3

|  |  | Polymer No. | | | | | |
|---|---|---|---|---|---|---|---|
|  |  | XIII | XIV | XV | XVI | XVII | XVIII |
| Weight fraction of monomeric units, % | Vinyl chloride | 85.2 | 89.8 | 91.0 | 80.8 | 86.6 | 82.3 |
|  | Vinyl alcohol | 11.8 | 5.8 | 6.0 | 3.4 | 5.4 | 4.5 |
|  | Vinyl carboxylate | 1.0 | 2.5 | 1.5 | 8.1 | 3.1 | 2.0 |
| by weight | Epoxy-containing vinyl | 0.5 | 0.8 | 0.6 | 2.5 | 1.5 | 1.0 |
|  | Amine-modified vinyl | 0.5 | 1.1 | 0.9 | 5.2 | 3.4 | 8.1 |
|  | 2-Ethylhexyl acrylate | — | — | — | — | — | 2.1 |
| Average degree of polymerization | | 320 | 420 | 410 | 420 | 460 | 410 |

In the preparation of the Polymer XX, the copolymer was obtained by the emulsion polymerization in the same manner as in Preparation 6 followed by salting-out, washing with water and drying and the copolymer was subjected to a saponification reaction at 40° C. for 6 hours with sodium hydroxide as the saponification agent in a solvent mixture of toluene and methyl alcohol without addition of any amine compound. In the preparation of the Polymer XXI, no epoxy-containing monomer was used in the copolymerization and the copolymer was saponified at 40° C. for 6 hours in a solvent mixture of methyl alcohol and toluene containing dimethyl ethanolamine without addition of sodium hydroxide.

In the preparation of the Polymer XXV, the copolymer was prepared by the suspension polymerization in the same manner as in Preparation 5 using 82 parts of vinyl chloride, 30 parts of vinyl acetate and 6 parts of 2-ethylhexyl acrylate as the initial charge of the monomers followed by supplementary introduction of 82 parts of vinyl chloride to give 165 parts of copolymer, which was saponified by using 5 parts of sodium hydroxide and 10 parts of dimethyl ethanolamine as the saponification agents.

In the preparation of the Polymer XXVI, the copolymer was prepared by the suspension polymerization in the same manner as in Preparation 5 using 80 parts of vinyl chloride, 34 parts of vinyl acetate and 6 parts of glycidyl acrylate as the initial charge of the monomers followed by supplementary introduction of 80 parts of vinyl chloride to give a copolymer, which was saponified by using 3 parts of sodium hydroxide as the saponification agent per 100 parts of the copolymer without using any amine compound.

Table 4 below gives the weight fractions of the respective types of the monomeric units in each of these Polymers together with the average degrees of polymerization thereof.

TABLE 4

|  |  | Polymer No. | | | | | | | |
|---|---|---|---|---|---|---|---|---|---|
|  |  | XIX | XX | XXI | XXII | XXIII | XXIV | XXV | XXVI |
| Weight fraction of monomeric units, % by weight | Vinyl chloride | 86.4 | 91.0 | 85.7 | 92.0 | 84.8 | 89.8 | 86.0 | 89.4 |
|  | Vinyl alcohol | 11.5 | 5.5 | — | 6.1 | 5.7 | 5.7 | 4.3 | 6.3 |
|  | Vinyl carboxylate | 1.1 | 3.0 | 13.8 | 1.2 | 7.8 | 2.8 | 2.4 | 1.3 |
|  | Epoxy-containing vinyl | — | — | — | — | — | — | — | 3.0 |
|  | Amine modified vinyl | 1.0 | — | 0.5 | 0.7 | 1.7 | 1.7 | 4.9 | — |
|  | 2-Ethylhexyl acrylate | — | — | — | — | — | — | 2.4 | — |
| Average degree of polymerization | | 310 | 420 | 410 | 420 | 410 | 470 | 400 | 430 |

EXAMPLE 1

A master liquid, referred to as the Liquid A hereinbelow, was prepared by uniformly mixing 100 parts of $\gamma$-$Fe_2O_3$ having an average length of the major axis of 0.3 $\mu$m and aspect ratio of 1/10, 2 parts of lecithin, 3 parts of a non-ionic surface active agent (Nonion #NS 230), 60 parts of methyl isobutyl ketone, 60 parts of methyl ethyl ketone and 60 parts of cyclohexanone.

Separately, 12 master liquids, referred to as the Liquids B hereinbelow, were prepared each by dissolving 25 parts of either one of the Polymers I to XII and 7 parts of a polyurethane resin (N-2304 manufactured by Nippon Polyurethane Co.) in a solvent mixture of each 65 parts of methyl isobutyl ketone, methyl ethyl ketone and cyclohexanone. In the preparation of the Liquids B using the Polymers VIII and IX, 2 parts of morpholine or pyridine, respectively, were added to the liquid.

The Liquid A still in the blending machine was admixed with one of the Liquids B and the mixing machine was run for additional 1 hour to agitate the mixture followed by further addition of 6 parts of Coronate L and agitation for 30 minutes. The thus obtained mixture was filtered through a filter having a pore diameter of 20 μm to give a magnetic coating composition.

A polyester film having a thickness of 16 μm was coated with the thus prepared magnetic coating composition, either as prepared or after aging for 24 hours at room temperature, in a thickness of 6 μm and subjected to a magnetic orientation treatment followed by drying and surface-finishing by calendering using a super-calendering machine to give a magnetic recording tape of which the magnetic properties were measured to give the results shown in Table 5 below. The surface gloss of the tapes was measured using a gloss meter at an angle of light incidence of 60° on the tape before the calendering treatment with a standard glass plate as the reference for the reflectivity in %. The magnetic properties were measured using a vibration magnetometer.

TABLE 5

| Polymer No. | Coating composition as prepared | | | Coating composition after aging | | |
|---|---|---|---|---|---|---|
| | Gloss, % | Br, gauss | Squareness ratio | Gloss, % | Br, gauss | Squareness ratio |
| I | 98 | 1400 | 0.85 | 97 | 1400 | 0.86 |
| II | 97 | 1340 | 0.80 | 99 | 1350 | 0.79 |
| III | 90 | 1410 | 0.82 | 89 | 1420 | 0.83 |
| IV | 85 | 1310 | 0.79 | 83 | 1300 | 0.80 |
| V | 87 | 1410 | 0.82 | 86 | 1420 | 0.82 |
| VI | 90 | 1280 | 0.80 | 91 | 1300 | 0.82 |
| VII | 75 | 1230 | 0.75 | 69 | 1260 | 0.68 |
| VIII | 78 | 1240 | 0.78 | 70 | 1130 | 0.65 |
| IX | 57 | 1010 | 0.65 | 45 | 980 | 0.60 |
| X | 55 | 1074 | 0.62 | 54 | 1012 | 0.54 |
| XI | 40 | 950 | 0.57 | 25 | 970 | 0.55 |
| XII | 62 | 1120 | 0.68 | 30 | 1170 | 0.58 |

EXAMPLE 2

The procedures for the preparation of magnetic coating compositions and the magnetic recording tapes using the coating compositions as prepared were substantially the same as in Example 1 excepting replacement of the Polymers I to XII with either one of the Polymers XIII to XXVI. The thus prepared magnetic recording tapes were subjected to the measurements of the surface gloss and and magnetic properties in the same manner as in Example 1. Separately, measurement of the thermal stability and analysis of the residual content of sodium ions were undertaken of each of the Polymers XIII to XXVI. The results are shown in Table 6 below. The thermal stability of the Polymers was measured in the procedure described below.

Thus, 1.0 g of the Polymer was taken in a 15 ml test tube and the test tube was held in an oil bath kept at 120° C. with the opening stoppered with a cotton plug holding a test paper of Congo Red exposed to the inside of the test tube. The heat stability of polymer was given by the length of time until the test paper was discolored by the hydrogen chloride gas evolved from the polymer by thermal decomposition.

TABLE 6

| Polymer No. | Magnetic recording tape | | | Magnetic coating composition | |
|---|---|---|---|---|---|
| | Gloss, % | Br, gauss | Squareness ratio | Thermal Stability, seconds | Na ions, ppm |
| XIII | 100 | 1400 | 0.85 | 1470 | <10 |
| XIV | 102 | 1340 | 0.83 | <1800 | <10 |
| XV | 106 | 1410 | 0.86 | <1800 | <10 |

TABLE 6-continued

| Polymer No. | Magnetic recording tape | | | Magnetic coating composition | |
|---|---|---|---|---|---|
| | Gloss, % | Br, gauss | Squareness ratio | Thermal Stability, seconds | Na ions, ppm |
| XVI | 101 | 1310 | 0.84 | <1800 | <10 |
| XVII | 99 | 1410 | 0.83 | <1800 | <10 |
| XVIII | 98 | 1280 | 0.81 | 1600 | <10 |
| XIX | 97 | 1350 | 0.84 | 196 | 56 |
| XX | 98 | 1310 | 0.81 | 310 | 80 |
| XI | 90 | 1290 | 0.84 | 320 | <10 |
| XXII | 100 | 1340 | 0.85 | 312 | 73 |
| XXIII | 95 | 1270 | 0.81 | 245 | 105 |
| XXIV | 92 | 1380 | 0.80 | 342 | 95 |
| XXV | 93 | 1200 | 0.79 | 324 | 84 |
| XXVI | 45 | 1200 | 0.68 | 1500 | 83 |

What is claimed is:

1. A magnetic coating composition for a magnetic recording medium which comprises:
    (A) an organic solvent;
    (B) fine particles of a ferromagnetic material dispersed in the organic solvent; and
    (C) a polymeric synthetic resin having an average degree of polymerization of 200 to 800 an being dissolved in the organic solvent, the polymeric molecules thereof comprising
        (a) from 60 to 95% by weight of monomeric units of vinyl choloride of the formula —CH$_2$—CHCl—,
        (b) from 2 to 16% by weight of monomeric units of vinyl alcohol of the formula —CH$_2$—CHOH—, and
        (c) from 0.05 to 5% by weight of monomeric units of an amine-modified vinyl.

2. A magnetic coating composition for a magnetic recording medium which comprises:
    (A) an organic solvent;
    (B) fine particles of a ferromagnetic material dispersed in the organic solvent; and
    (C) a polymeric synthetic resin having an average degree of polymerization of 200 to 800 and being dissolved in the organic solvent, the polymeric molecules thereof comprising
        (a) from 60 to 95% by weight of monomeric units of vinyl chloride of the formula —CH$_2$—CHCl—,
        (b) from 2 to 16% by weight of monomeric units of vinyl alcohol of the formula —CH$_2$—CHOH—,
        (c) from 0.05 to 5% by weight of monomeric units of an amine-modified vinyl;
        (d) from 0.5% to 39% by weight of monomeric units of vinyl carboxylate; and
        (e) from 0.1 to 20% by weight of monomeric units of an epoxy-containing monomer.

3. A magnetic recording medium which comprises:
    (A) a substrate; and
    (B) a magnetic coating layer on the surface of the substrate, the magnetic coating layer comprising particles of a ferromagnetic material and a synthetic copolymeric resin having an average degree of polymerization of 200 to 800 as a vehicle of the particles, of which the molecules comprise
        (a) from 60 to 95% by weight of monomeric units of vinyl chloride of the formula —CH$_2$—CHCl—, (b) from 2 to 16% by weight of monomeric units of vinyl alcohol of the formula —CH$_2$—CHOH—, and (c) from 0.05 to 5% by weight of monomeric units of an amine-modified vinyl.

4. A magnetic recording medium which comprises:

(A) a substrate; and (B) a magnetic coating layer on the surface of the substrate, the magnetic coating layer comprising the particles of a ferromagnetic material and a synthetic copolymeric resin having an average degree of polymerization of 200 to 800 as a vehicle of the particles, of which the molecules comprise (a) from 60 to 95% by weight of monomeric units of vinyl chloride of the formula —CH$_2$—CHCl—, (b) from 2 to 16% by weight of monomeric units of vinyl alcohol of the formula —CH$_2$—CHOH, (c) from 0.05 to 5% by weight of monomeric units of an amino-modified vinyl, (d) from 0.5 to 39% by weight of monomeric units of a vinyl carboxylate, and (e) from 0.1 to 20% by weight of monomeric units of an epoxy-containing monomer.

* * * * *

UNITED STATES PATENT AND TRADEMARK OFFICE
CERTIFICATE OF CORRECTION

PATENT NO. : 4,770,941

DATED : September 13, 1988

INVENTOR(S) : Kyoiti Imai et al.

It is certified that error appears in the above-identified patent and that said Letters Patent is hereby corrected as shown below:

In column 14, line 26, the line reads -- degree of polymerization of 200 to 800 an being -- it should read: degree of polymerization of 200 to 800 and being --.

In column 15, line 13, the line reads -- the particles of a ferromagnetic material and a -- it should read: particles of a ferromagnetic material and a --.

Signed and Sealed this

Twenty-eighth Day of February, 1989

*Attest:*

DONALD J. QUIGG

*Attesting Officer*   *Commissioner of Patents and Trademarks*